United States Patent
Higgs et al.

(10) Patent No.: US 11,112,928 B2
(45) Date of Patent: Sep. 7, 2021

(54) AVOIDING BAD INPUT DURING USER INTERFACE LAYOUT CHANGES USING SNAPSHOTS

(71) Applicant: INTERNATIONAL BUSINESS MACHINES CORPORATION, Armonk, NY (US)

(72) Inventors: Raymond M. Higgs, Poughkeepsie, NY (US); Christopher Colonna, Ossining, NY (US); Luke Hopkins, Peterborough, NH (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 168 days.

(21) Appl. No.: 16/164,569

(22) Filed: Oct. 18, 2018

(65) Prior Publication Data

US 2020/0125217 A1    Apr. 23, 2020

(51) Int. Cl.
| | |
|---|---|
| G06F 3/0484 | (2013.01) |
| G06F 3/0482 | (2013.01) |
| G06F 16/954 | (2019.01) |
| G06F 3/0481 | (2013.01) |
| G06F 3/01 | (2006.01) |

(52) U.S. Cl.
CPC .............. *G06F 3/0481* (2013.01); *G06F 3/01* (2013.01)

(58) Field of Classification Search
CPC ............................. G06F 3/0482; G06F 16/954
See application file for complete search history.

(56) References Cited

U.S. PATENT DOCUMENTS

| | | | |
|---|---|---|---|
| 2005/0050167 A1* | 3/2005 | Kim | ................. H04L 67/025 709/218 |
| 2013/0227482 A1* | 8/2013 | Thorsander | ........... G06F 3/0482 715/821 |
| 2015/0026561 A1* | 1/2015 | Nakatsuji | ............ G06F 17/2247 715/234 |
| 2015/0170050 A1 | 6/2015 | Price | |

(Continued)

OTHER PUBLICATIONS

Chromium Blog, [online]; [retrieved on Oct. 18, 2018]; retrieved from the Internet https://blog.chromium.org/2017/04/scroll-anchoring-for-web-developers.html, S. Kobes, "Scroll anchoring for web developers", Chromium Blog: News and developments from the open source browser project, Apr. 11, 2017, 3 pgs.

*Primary Examiner* — Sherief Badawi
*Assistant Examiner* — Lee V Nguyen
(74) *Attorney, Agent, or Firm* — Cantor Colburn LLP; Edward Wixted

(57) ABSTRACT

According to one or more embodiments of the present invention, a computer-implemented method includes receiving a request to update a layout of a user interface being rendered. The method further includes receiving a user input for an element of the user interface. The method further includes determining whether the user input is received within a predetermined duration since receiving the request to update the layout. The method further includes, based on a determination that the user input is received after completion of the predetermined duration, accepting the user input. The method further includes, based on a determination that the user input is received prior to completion of the predetermined duration, rejecting the user input.

14 Claims, 11 Drawing Sheets

(56) References Cited

U.S. PATENT DOCUMENTS

| | | |
|---|---|---|
| 2015/0379558 A1 | 12/2015 | Jancar et al. |
| 2016/0196026 A1 | 7/2016 | Huang et al. |
| 2017/0003982 A1* | 1/2017 | Huang .................. G06F 3/0484 |
| 2018/0239501 A1* | 8/2018 | Reddy ..................... G06F 3/015 |
| 2019/0187868 A1* | 6/2019 | Horiuchi ............... G06F 3/0481 |

* cited by examiner

AVOIDING BAD INPUT DURING USER INTERFACE LAYOUT CHANGES USING SNAPSHOTS

BACKGROUND

The present invention relates to computing technology, and particularly to avoiding bad input during user interface layout changes using snapshots when using computer applications.

The amount of data and information available via computer applications, particularly, on the internet and other communication networks is growing rapidly. Web browsers are one tool by which a user may find desired information. As the amount of available information increases, the need for managing computer applications, such as web browsers, which may alter a layout of the user interface periodically, may also increase.

SUMMARY

According to one or more embodiments of the present invention, a computer-implemented method includes receiving a request to update a layout of a user interface being rendered. The method further includes receiving a user input for an element of the user interface. The method further includes determining whether the user input is received within a predetermined duration since receiving the request to update the layout. The method further includes, based on a determination that the user input is received after completion of the predetermined duration, accepting the user input. The method further includes, based on a determination that the user input is received prior to completion of the predetermined duration, rejecting the user input.

According to one or more embodiments of the present invention a system includes a memory, and a processor coupled with the memory. The processor renders one or more user interfaces, wherein rendering the user interfaces comprises performing a method that includes receiving a request to update a layout of a user interface being rendered. The method further includes receiving a user input for an element of the user interface. The method further includes determining whether the user input is received within a predetermined duration since receiving the request to update the layout. The method further includes, based on a determination that the user input is received after completion of the predetermined duration, accepting the user input. The method further includes, based on a determination that the user input is received prior to completion of the predetermined duration, rejecting the user input.

According to one or more embodiments of the present invention, a computer program product includes a computer readable storage medium having stored thereon program instructions executable by one or more processing devices to perform a method that includes receiving a request to update a layout of a user interface being rendered. The method further includes receiving a user input for an element of the user interface. The method further includes determining whether the user input is received within a predetermined duration since receiving the request to update the layout. The method further includes, based on a determination that the user input is received after completion of the predetermined duration, accepting the user input. The method further includes, based on a determination that the user input is received prior to completion of the predetermined duration, rejecting the user input.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
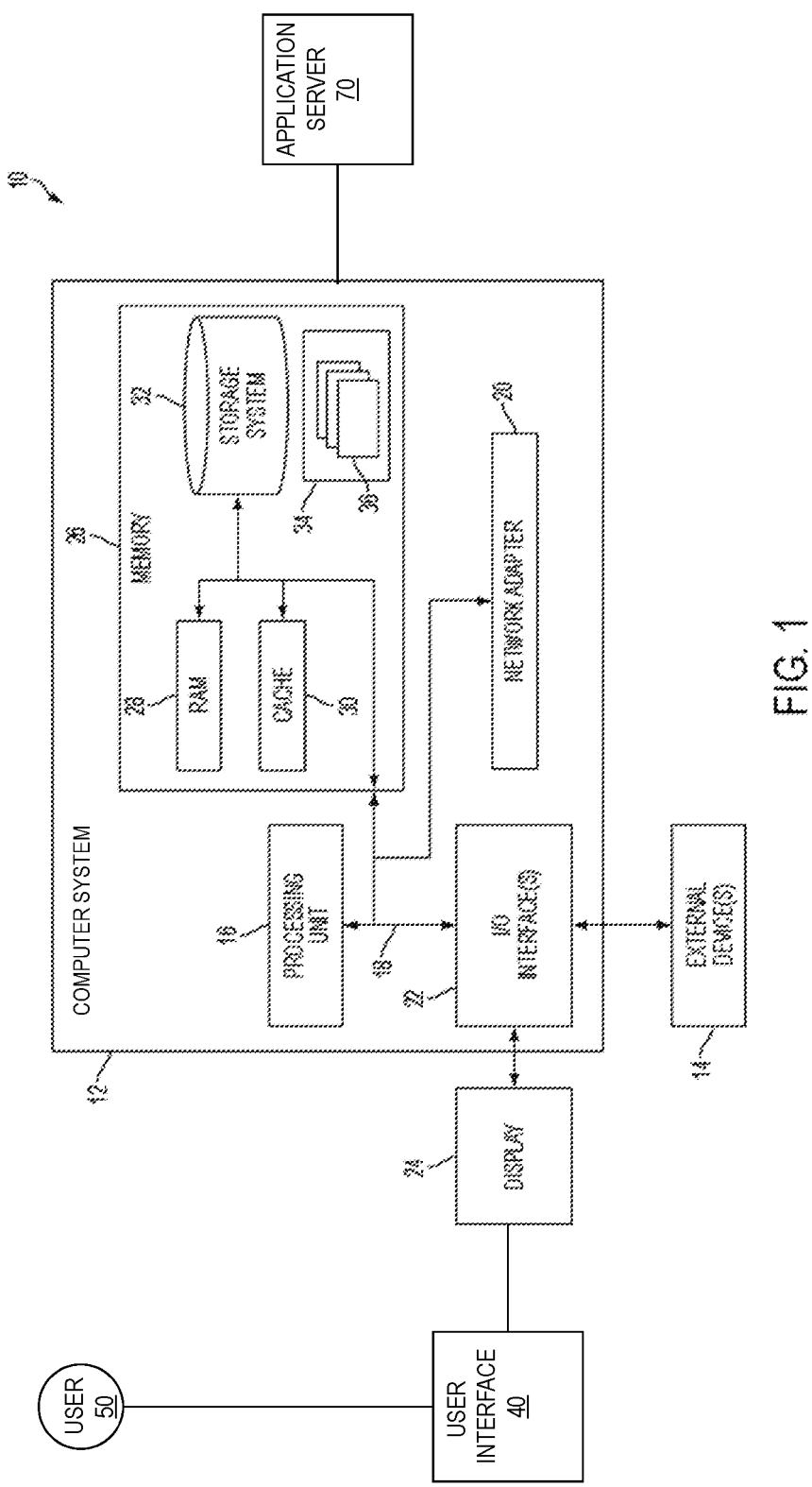
FIG. 1 depicts a schematic of an example of a webpage browsing system according to one or more embodiments of the present invention.

FIG. 1 depicts a schematic of an example of a system 10 according to one or more embodiments of the present invention. The system 10 is a computing system that facilitates executing a computer program application that has a user interface that updates layout periodically. The layout can update in a synchronous or asynchronous manner. For example, the system 10 can be a web browsing system with the user interface depicting a webpage, the layout of the webpage updating periodically. The depicted system 10 is only one example of a suitable computing system and is not intended to suggest any limitation as to the scope of use or functionality of embodiments of the invention described herein.

In system 10 there is a computer system 12, which is operational with numerous other general purpose or special purpose computing system environments or configurations.

Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in system 10 is shown in the form of a general-purpose computing device. The components of computer system 12 may include, but are not limited to, one or more processors or processing units 16, a system memory 26, and a bus 18 that couples various system components including system memory 26 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 12 typically includes a variety of computer system readable media. Such media may be any available media that is accessible by computer system 12, and it includes both volatile and non-volatile media, removable and non-removable media.

System memory 26 can include computer system readable media in the form of volatile memory, such as random access memory (RAM) 28 and/or cache memory 30. Computer system 12 may further include other removable/non-removable, volatile/non-volatile computer system storage media. By way of example only, storage system 32 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 26 may include at least one program product having a set (e.g., at least one) of program modules that are configured to carry out the functions of embodiments of the invention.

Program/utility 34, having a set (at least one) of program modules 36, may be stored in memory 26 by way of example, and not limitation, as well as an operating system, one or more application programs, web browser, other program modules, and program data. Each of the operating system, one or more application programs, other program modules, and program data or some combination thereof may include an implementation of a networking environment. Program modules 36 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

The computer system 12 can facilitate a user 50 to access a user interface 40 of a computer application that has a backend operation on an application server 70. The user interface 40 has a layout that includes positions and sizes of one or more user interface elements. The application server 70 can update the layout of the user interface 40 periodically. In one or more examples, the application can be a web browser and the user interface 40 can be a webpage that the user 50 is browsing from a webserver that is the application server 70. The user interface 40 can be a webpage or an application that provides content from a news server, a social media network, a search engine, a media streaming server, an e-commerce server, or any other such online content that the user 50 can access on the Internet.

In general, user interfaces, such as webpages have become increasingly complex. For example, the user interface 40 can include multiple elements including frames which in turn can include advertisements, video players, music players, text, dynamic widgets, calendars, and various other such content. These elements can be classified as elements that accept user input (e.g. various buttons, hyperlinks, text input boxes, etc.) and elements that do not accept user input (e.g. text display, image display, etc.). One or more elements on the user interface 40 can change dynamically in response to various trigger events. For example, periodically advertisements on the user interface 40 reload. Alternatively, or in addition, when video and/or music players play content, an advertisement can be inserted in the middle of the playback. Also, in one or more examples, such media players automatically load additional content to playlists that a user has selected for playback. Alternatively, or in addition, in case the user interface 40 is displaying news, a live report of an event (such as a sports event, a news conference etc.) or other continuously changing information, the content is refreshed at a predetermined frequency or in response to an event. All of such changes to content or several other types of dynamic changes to the user interface 40 cause an application program 34 that is rendering the user interface 40 to change the layout of the user interface 40, and the changes may appear random to the user 50. In yet other examples, resizing the window of the application program 34 can cause the layout of the user interface 40 to be modified.

When the layout of the user interface 40 changes, the user 50 may accidentally click (using an input device such as a mouse) or tap (in case of a touchscreen) on the wrong element. This can be even more frustrating in case the computer system 12 is a mobile device with a relatively smaller screen, in comparison to a desktop computer, for example. Such cases of input to a wrong element can be frustrating in other cases such as in the case of a weak network connectivity. In such a case, when the wrong input is accepted by the application program 34, such as a web browser, it loads another unwanted webpage. The user 50 typically has to use the back button to reload the original user interface 40, and try again to select the content that he/she wants. This can be time-consuming.

One or more embodiments of the present invention address such technical challenges of wrong input being provided to a user interface 40 via the application program 34 because of layout changes in the user interface 40. Accordingly, embodiments of the present invention are rooted in computer technology, such as web browsing, and provide improvements to web browsing systems and techniques. For example, embodiments of the present invention save the user time, amount of data communicated via the computer networks. Other improvements to computer technology and web browsing that are provided by embodiments of the present invention can be identified by a person skilled in the art.

Figure 2:
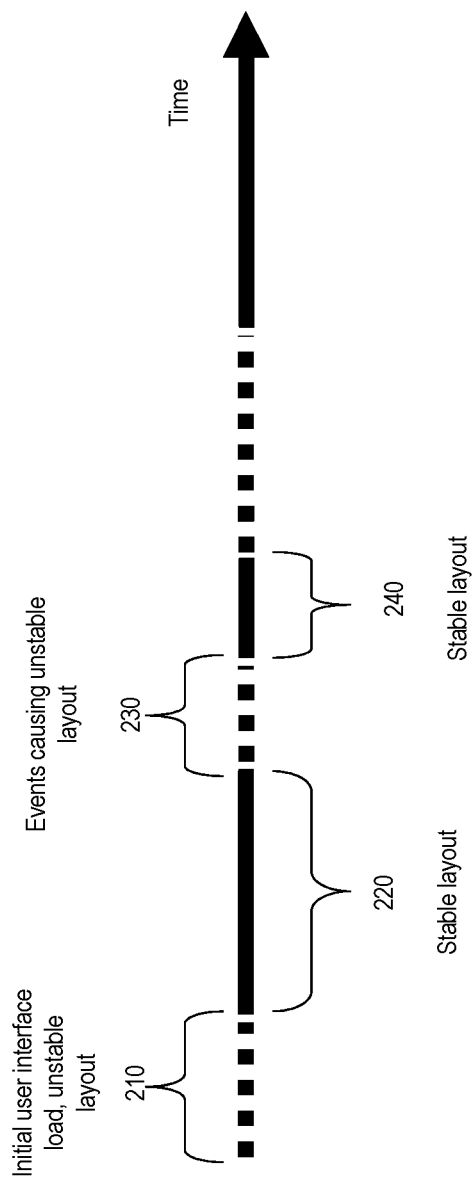
FIG. 2 depicts a timeline of layout changes of a webpage according to one or more embodiments of the present invention.

According to one or more embodiments of the present invention, the improvements to computer application user interfaces, such as those used for web browsing are provided based on a timeline of layout changes of the user interface 40. FIG. 2 depicts a timeline of layout changes of a webpage according to one or more embodiments of the present invention. The layout of the user interface 40 is initially unstable as the user interface 40 loads (210). Once loaded the user interface 40 has a stable layout for a first duration of time (220). Later, events like advertisement changes, content update (live scores, news update etc.), cause the layout of the user interface 40 to become unstable again for a second duration of time (230). This may happen several times depending on the content of the user interface 40, and how long the user 50 stays on the user interface 40. The user interface 40 regains the stable layout (240) after the second duration, and the unstable-stable layout can cycle as described.

FIG. 2, in other words, depicts a timeline showing layout changes that may occur while using the user interface 40, such as when visiting the webpage. The dashed lines identify periods of instability (210 and 230). An "unstable" layout of the user interface 40, as used herein, indicates that the layout is changing during that time. The solid lines identify periods of stability (220 and 240). A "stable" layout of the user interface 40, as used herein, indicates that the layout is not changing during that time.

Figure 3:
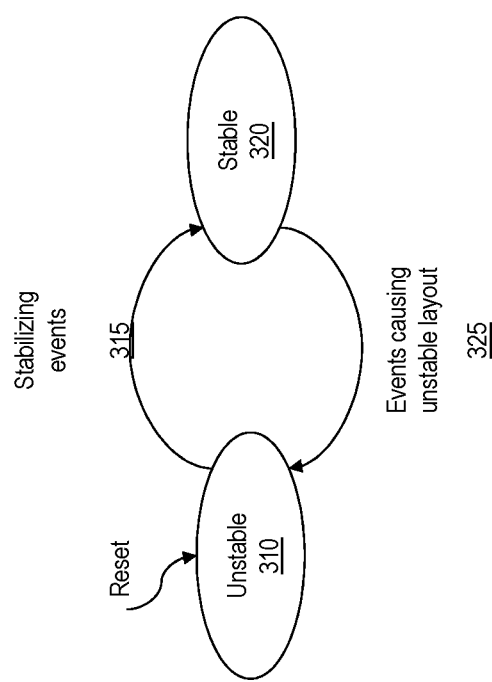
FIG. 3 depicts a state machine for one or more elements of a webpage changing layout according to one or more embodiments of the present invention.

FIG. 3 depicts a state machine for one or more elements of a webpage changing layout according to one or more embodiments of the present invention. Here transitions between a stable state 320 and an unstable state 310 of the layout of the user interface 40 are depicted. The elements of the user interface 40 that change layouts as described herein are typically implemented with scripts running in the application program 34. Such scripts are not predictable by the application program 34. In one or more examples, the scripts do not run to completion. Instead, the scripts run indefinitely with periods of inactivity. Periods of inactivity are often waiting for an event 325 such as user input, a timer to expire, or a message from the application server 70. Such events 325 cause the user interface 40 to transition into the unstable state 310.

There are numerous stabilizing events 315 that can occur moving the webpage to the stable state 320. It should be noted that the user interface 40 may have many scripts running. The multiple scripts of the user interface 40 have to experience a stabilizing event 315 for the entire user interface 40 to be considered stable. Some examples of stabilizing events 310 are shown in Table 1.

TABLE 1

| Type | Event |
| --- | --- |
| Non-speculative | A script has executed a blocking function call, e.g. "await sleep( )" in JavaScript. |
| Non-speculative | A script is waiting for user input. E.g. in JavaScript, an onclick handlers have been registered for various elements on the webpage. |
| Non-speculative | A script is waiting for a network event. e.g. in JavaScript, the message( ) handler for a socket. |
| Speculative | $T_{settle}$ time has elapsed since the last rendering request from a script. |

According to one or more embodiments of the present invention, the stabilizing events 315 can be categorizing into speculative stabilizing events and non-speculative stabilizing events. For example, events such as completion of execution of script, the user interface 40 waiting for a user input, or the user interface 40 waiting for a particular event from the application server 70 can be considered non-speculative because, until a further event occurs, the layout of the user interface 40 is stable.

Instead, an event such as a timer $T_{settle}$ expiring, which can have a variable duration is speculative. $T_{settle}$ is a duration, which can be measured using a timer, and after completion of the $T_{settle}$ duration since a render request, the application can tentatively identify or speculate that the layout of the user interface 40 is stable. Because the rendering of the user interface 40 is asynchronous to the timer expiration, this event is speculative. Such a speculative method to determine stability can include tracking rendering requests made by a script. If a certain period of time has elapsed without further rendering requests, then the application program 34 can deem that the layout is stable.

Figure 4:
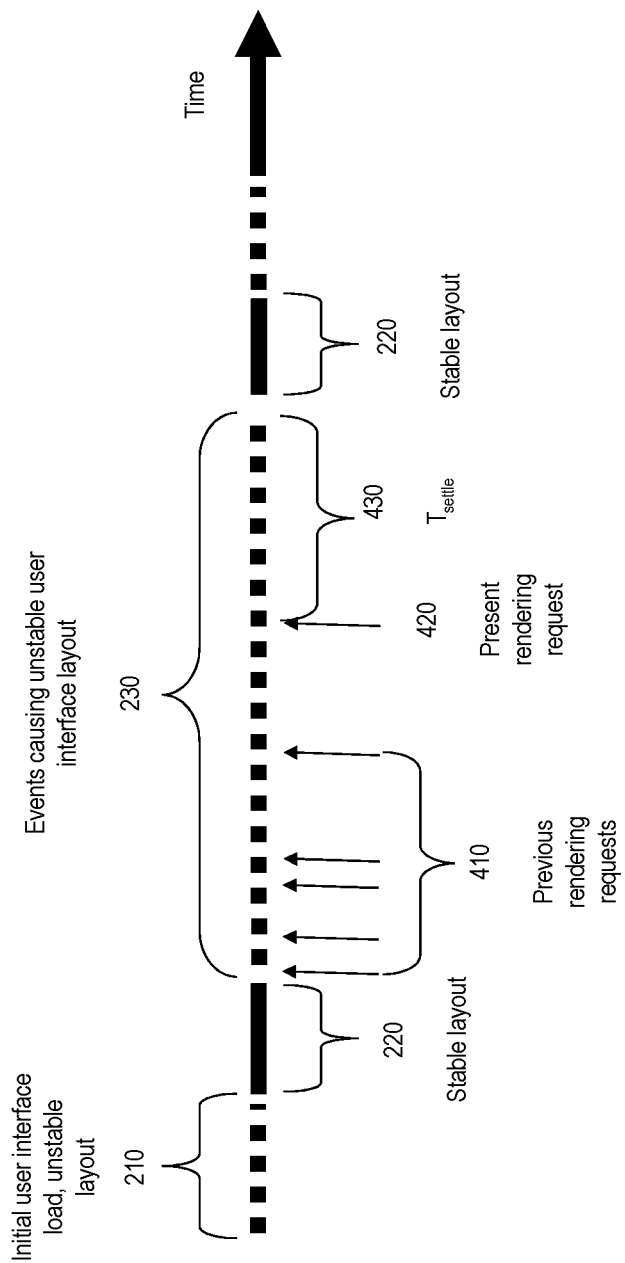
FIG. 4 depicts another timeline view of the changes to a layout of a user interface according to one or more embodiments of the present invention.

FIG. 4 depicts another timeline view of the changes to a layout of a user interface according to one or more embodiments of the present invention. FIG. 4 provides a more detailed version of FIG. 2, particularly by depicting rendering requests from the script to the application program 34 that are one or more of the events that cause instability 230. Such events are indicated with vertical arrows in FIG. 4. As the rendering requests arrive, the application program 34 starts a timer ($T_{settle}$) to determine when the layout of the user interface 40 has stabilized.

The duration of the timer $T_{settle}$ does not have to be a constant value. It may be adjusted dynamically based on historical data, and characteristics about the user interface 40. As shown in FIG. 4, previous rendering requests 410 may or may not have been completed when a new rendering request (present rendering request) 420 is received. In response to particular types of rendering requests that the application identifies to affect the layout of the user interface 40, the application program 34 starts the timer $T_{settle}$ 430 and after the timer 430 has expired, considers the user interface 40 to have a stable layout 220.

The technical solutions provided by one or more embodiments of the present invention described herein use the application program's 34 ability to be aware of when the user interface 40 is stable.

In addition to the timer 430, the application program 34 also uses the proximity of rendering requests 410 when determining whether the user interface 40 has a stable layout 220. For example, rendering requests 410 that change elements that do not accept input do not cause other user input elements to move. Also, rendering requests that change elements outside the view of the user 50 without secondary movements of visible elements of the user interface 40 do not cause a layout instability. Further, if the screen is partitioned, rendering requests 410 in one partition may not affect the stability of neighboring partitions. Such rendering requests that do not affect the layout of the user interface 40 do not need to be considered significant rendering requests. Because the goal of one or more embodiments of the present invention is to minimize movement of elements that accept user input, these rendering requests do not cause the user 50 to give bad input (clicking on a first element instead of a second element that was just replaced by the first element because of a layout change).

Proximity becomes particularly important for webpages that have embedded media playback, such as video or animation, which is sometimes implemented by a script. Such a script updates only the partition where the media is being displayed. In the partition where the playback is being performed, the rendering updates are desirable, and do not affect neighboring partitions. So the application program 34 ignores stability in the partition that is performing the playback.

Figure 5:
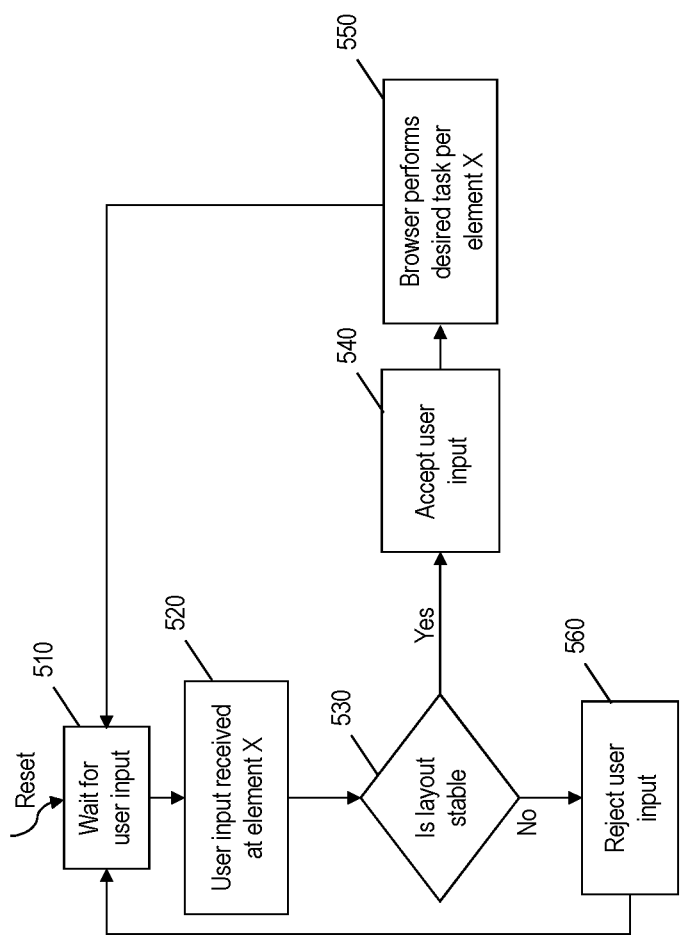
FIG. 5 depicts a flowchart of a method for avoiding bad input during changes to a layout of a user interface according to one or more embodiments of the present invention.

FIG. 5 depicts a flowchart of a method for avoiding bad input during changes to a layout of the user interface according to one or more embodiments of the present invention. The method is implemented after a present rendering request 420 has been received. The application program 34 waits for a user input, at 510. The user input is received at a first element on the user interface 40, say element-X, at 520. The application program 34 first checks if the layout of the user interface 40 is stable, at 530. This can be done by the application program 34 checking if the timer 430 has expired since the present rendering request 420.

If the timer 430 has not expired, the application program 34 deems that the layout of the user interface 40 is unstable, and rejects the user input, at 560. Accordingly, any response that the user 50 expected upon clicking the element-X is not provided because in one or more examples, the application program 34 does not transfer the user input to the element-X of the user interface 40.

Instead, if the timer 430 has expired, the application program 34 deems that the layout of the user interface 40 is stable, and hence, accepts the user input, at 540. Accepting the user input includes the application program 34 transferring the user input to the element-X of the user interface 40. The application program 34 further performs the one or more operations according to the script of the element-X upon receiving the user input, at 550.

Accordingly, the method from FIG. 5, avoids a potential bad input from the user 50. For example, consider that the element-X replaced another element, element-Y during the present rendering request 420. In such a case, the user 50 may be intending to click (or provide other user input) to the element-Y, but instead, because of the layout changes, clicks on the element-X. By rejecting the user input at least during the duration of the timer 430, the application program 34 avoids a bad input, an input that was intended for the element-Y is prevented from reaching the element-X.

Figure 6:
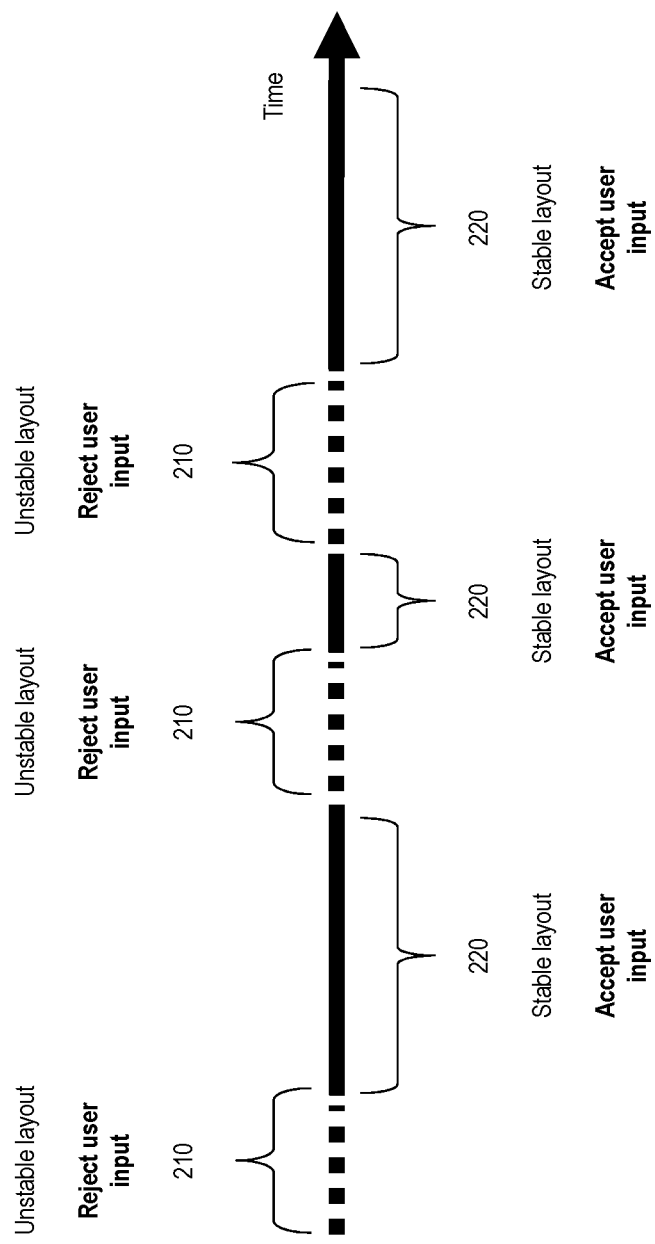
FIG. 6 depicts a timeline for the user interface interaction according to one or more embodiments of the present invention.

FIG. 6 depicts a timeline for the webpage interaction according to one or more embodiments of the present invention. Particularly, the timeline here is corresponding to the embodiments of the present invention described in reference to FIG. 5. Here, the user input is only accepted during the periods of stable layout 220, and the user input is rejected during the periods of unstable layout 210.

Figure 7:
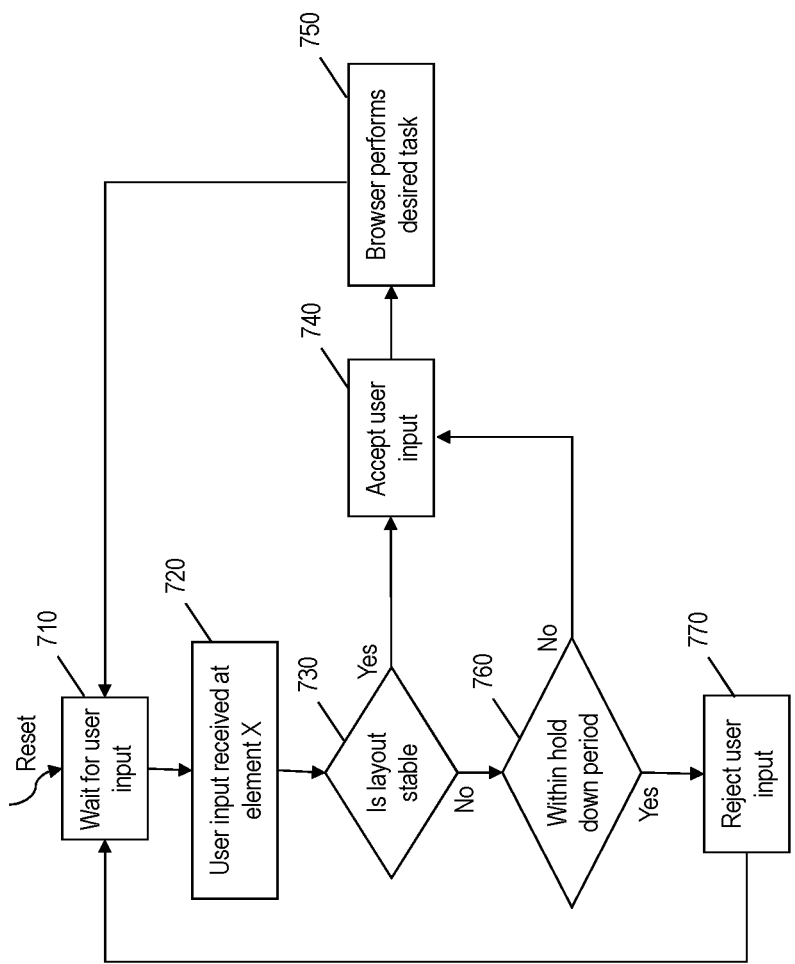
FIG. 7 depicts a flowchart of a method for avoiding bad input during changes to a layout of a user interface according to one or more embodiments of the present invention.

FIG. 7 depicts a flowchart of a method for avoiding bad input during changes to a layout of the user interface according to one or more embodiments of the present invention. The method is implemented after a present rendering request 420 has been received. The application program 34 waits for a user input, at 710. The user input is received at a first element on the user interface 40, say element-X, at 720. The application program 34 first checks if the layout of the user interface 40 is stable, at 730. This can be done by the application program 34 checking if the timer 430 has expired since the present rendering request 420.

If the timer 430 has expired, the application program 34 deems that the layout of the user interface 40 is stable, and hence, accepts the user input, at 740. Accepting the user input includes the application program 34 transferring the user input to the element-X of the user interface 40. The application program 34 further performs the one or more operations according to the script of the element-X upon receiving the user input, at 750.

Instead, if the timer 430 has not yet expired, the application program 34 deems that the layout of the user interface 40 is unstable, at 730. In such a case, the application program 34 initiates a second timer for a hold down period. The second timer facilitates the application program 34 to ignore user input initially during a period of instability 210.

The hold down period is preconfigured to durations similar to human reaction times. These reaction times are different for different types of input. For example, the user 50 may be, typically, quicker at tapping (using a touchpad) than at mouse clicks, or using the keyboard. For example, the reaction times can be 0.3 seconds, 0.2 seconds, or any other such preconfigured value. In one or more examples, the hold down period may be determined by the application program 34 based on historical data for user reaction times. For example, the application program 34 may determine the hold down period using the historical data based on a machine learning algorithm.

The application program 34, in the case of receiving the user input during unstable layout 210, checks if the user input is received within the hold down period, that is, before the second timer has expired, at 760. In case the user input is received during the hold down period, the application program 34 rejects the user input, at 770.

Otherwise, the application program 34 accepts the user input, at 740, if the second timer has expired. This hold down period gives the user 50 time to recognize that the user interface 40 is changing, and yet the ability to eventually continue input. This avoids the indefinite non-responsive webpage issue that may be experienced in case of the method in FIG. 5. In this case, the accepted user input is transferred to a new element, say element-Y, from the updated layout of the user interface 40.

Figure 8:
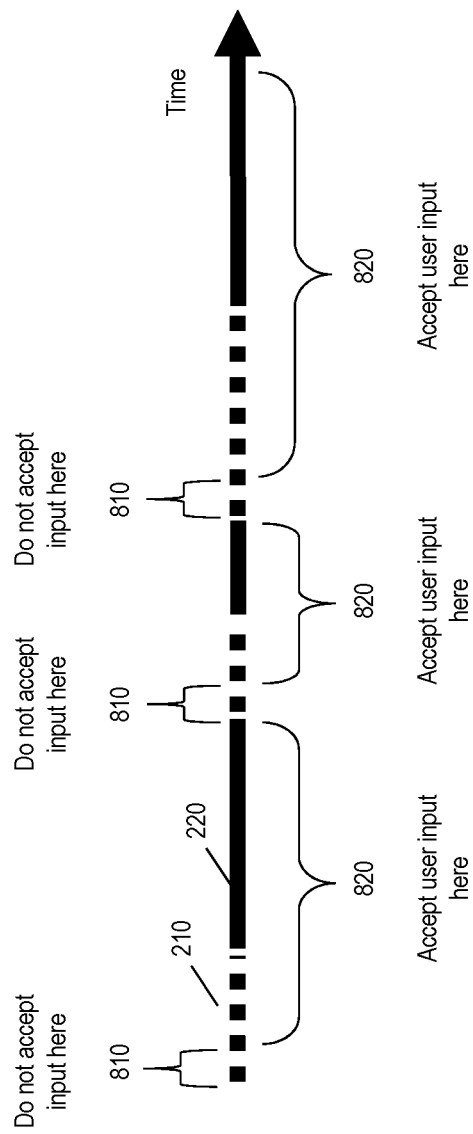
FIG. 8 depicts a timeline for the webpage interaction according to one or more embodiments of the present invention.

FIG. 8 depicts a timeline for the webpage interaction according to one or more embodiments of the present invention. Particularly, the timeline here is corresponding to the embodiments of the present invention described in reference to FIG. 7. Here, the user input is only accepted during the duration 820 that includes the period of stable layout 220, and a portion of the unstable layout period 210 after completion of the hold down period. The user input is rejected during the periods 810, which include the portion of the unstable layout 210 during which the hold down timer is active.

Figure 9:
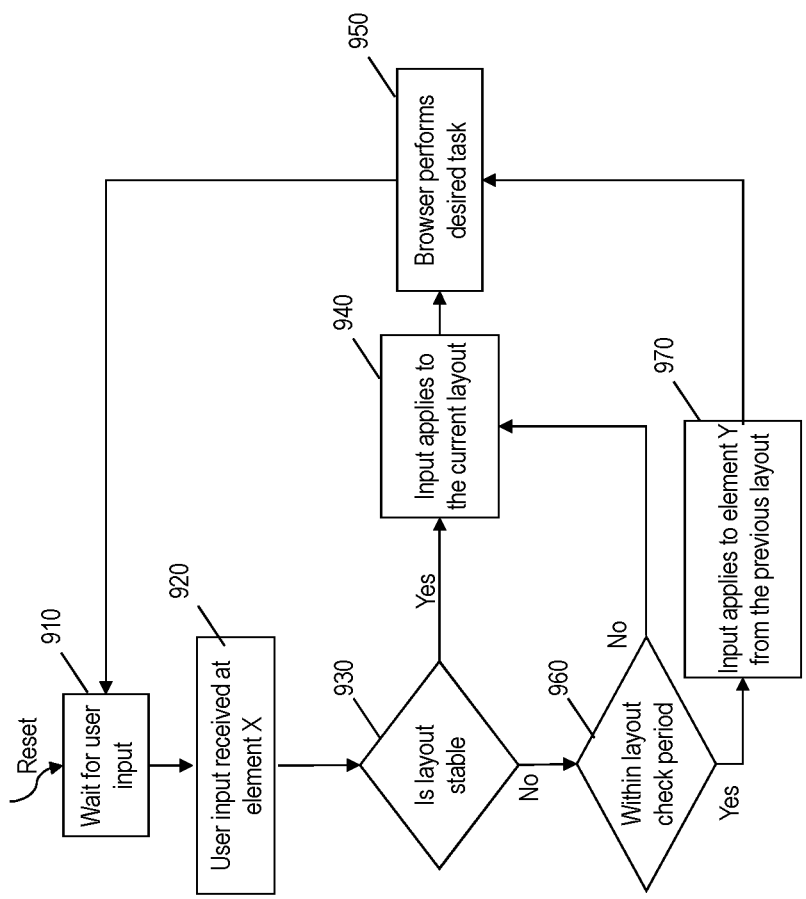
FIG. 9 depicts a flowchart of a method for avoiding bad input during changes to a layout of a user interface according to one or more embodiments of the present invention.

FIG. 9 depicts a flowchart of a method for avoiding bad input during changes to a layout of the user interface according to one or more embodiments of the present invention. The method is implemented after a present rendering request 420 has been received. The application program 34 waits for a user input, at 910. The user input is received at a first element on the user interface 40, say element-X, at 920. The application program 34 first checks if the layout of the user interface 40 is stable, at 930. This can be done by the application program 34 checking if the timer 430 has expired since the present rendering request 420. Here, consider that the element-X has replaced an element-Y from a previous stable layout in response to the present rendering request 420.

If the timer 430 has expired, the application program 34 deems that the layout of the user interface 40 is stable, and hence, accepts the user input, at 940. Accepting the user input includes the application program 34 transferring the user input to the element-X of the user interface 40 according to the present layout. The application program 34 further performs the one or more operations according to the script of the element-X upon receiving the user input, at 950.

Instead, if the timer 430 has not yet expired, the application program 34 deems that the layout of the user interface 40 is unstable, at 930. In such a case, the application program 34 initiates a second timer for a layout check period. The second timer facilitates the application program 34 to determine whether the user 50 provides user input for the element-X in the present layout or for the element-Y from the previous layout of the user interface 40 during the period of instability 210. If the user input is received with the layout check period, that is before the second timer expires, the application program 34 deems that the user input is intended for the element-Y that was previously in the position of element-X, 970. The user input is accordingly forwarded to the element-Y (and not element-X), and the application program 34 performs one or more operations according to the script of element-Y, at 950.

Otherwise, if the user input is after the layout check period, that is after the second timer has expired, the application program 34 deems that the user input is for the element-X in the present layout, at 960. Accordingly, the user input is accepted and transferred to the element-X, at 940. The application program 34 subsequently performs the operations as per the element-X, at 950.

The layout check period is preconfigured to durations similar to human reaction times. These reaction times are different for different types of input. For example, the user 50 may be, typically, quicker at tapping (using a touchpad) than at mouse clicks, or using the keyboard. For example, the reaction times can be 0.3 seconds, 0.2 seconds, or any other such preconfigured value. In one or more examples, the layout check period may be determined by the application program 34 based on historical data for user reaction times. For example, the application program 34 may determine the layout check period using the historical data based on a machine learning algorithm.

Figure 10:
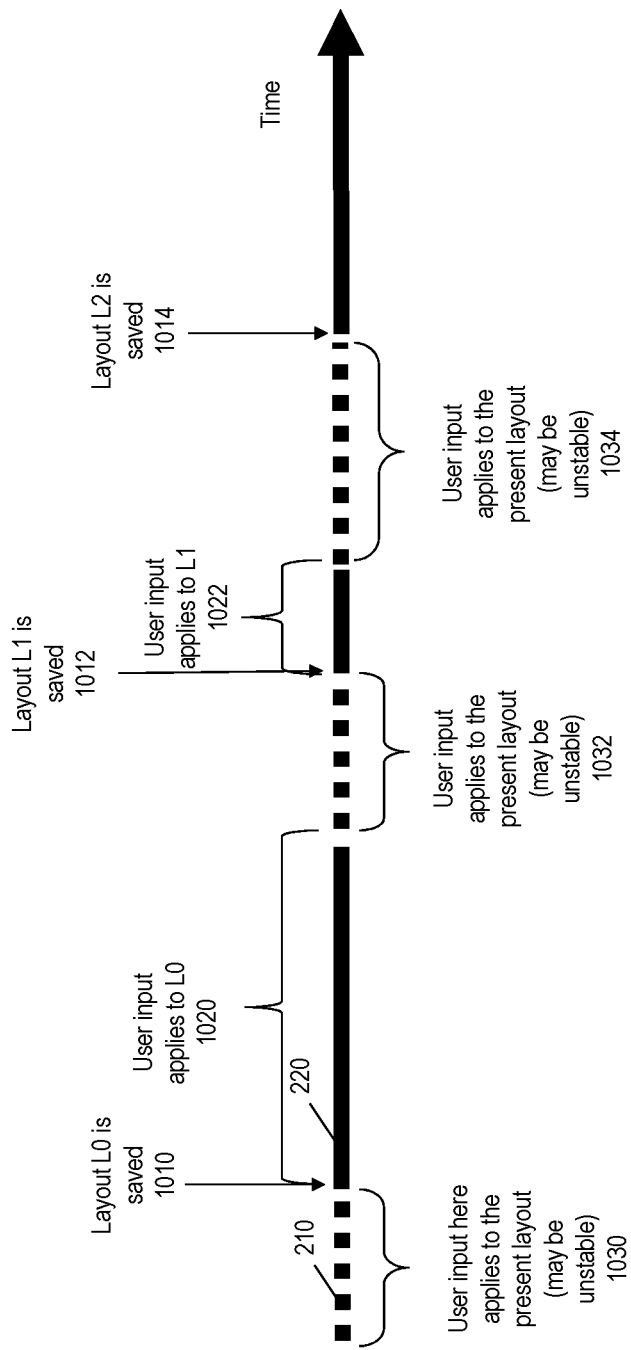
FIG. 10 depicts a timeline for the webpage interaction according to one or more embodiments of the present invention.

FIG. 10 depicts a timeline for the webpage interaction according to one or more embodiments of the present invention. Particularly, the timeline here is corresponding to the embodiments of the present invention described in reference to FIG. 9. Here, the application program 34 captures and stores a snapshot of a present layout L0 of the user interface 40 (1010) once the application program 34 deems that the user interface 40 has a stable layout 220. Capturing and storing the snapshot of the layout includes storing positions for each element in the user interface 40. The positions can be stored in the form of coordinates, sequence, or any other format that facilitates the application program 34 to render the elements upon request and facilitate the application program 34 to determine which element received a user input, such as a click, a tap, etc.

While the captured layout of the user interface 40 does not change, i.e. during the period of stability 220, a user input is transferred to the appropriate element of the webpage based on determining which element received the user input (1030).

Upon subsequent render request 410, the layout L0 of the user interface 40 changes to a layout L1. For the layout check period since the layout change, a user input is mapped to the elements according to the layout L0 (1020). After the layout check period is completed, the user input is mapped to elements according to the layout L1 (1032).

Further, once L1 is deemed to be stable, the application program 34 captures and stores the snapshot of the layout L1 (1012). In one or more examples, the snapshot of L1 overwrites the snapshot of L0. Another layout check period ensues (1022) during which user input is mapped to L1, after which the user input is mapped to a replacement layout L2 (1034). The snapshot of the layout L2 is subsequently captured and stored (1014). The above described process repeats itself.

Figure 11:
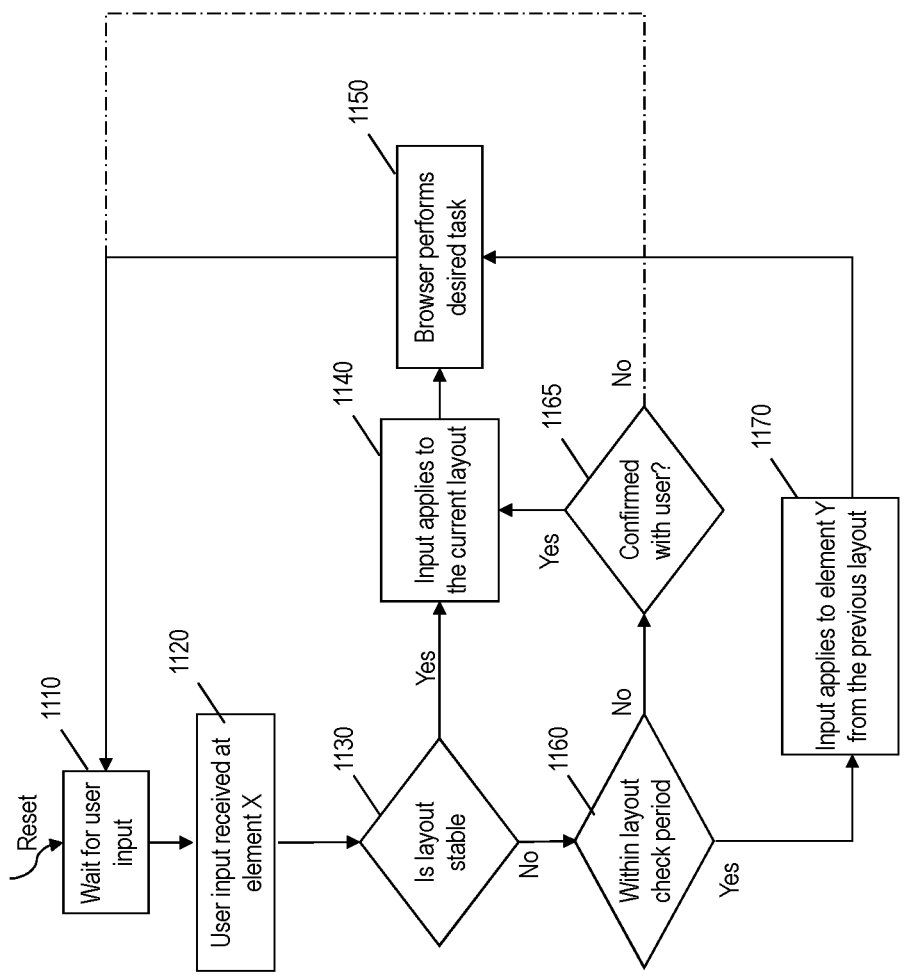
FIG. 11 depicts a flowchart of a method for avoiding bad input during changes to a layout of a user interface according to one or more embodiments of the present invention.

FIG. 11 depicts a flowchart of a method for avoiding bad input during changes to a layout of the user interface according to one or more embodiments of the present invention. The method is implemented after a present rendering request 420 has been received. The application program 34 waits for a user input, at 1110. The user input is received at a first element on the user interface 40, say element-X, at 1120. The application program 34 first checks if the layout of the user interface 40 is stable, at 1130. This can be done by the application program 34 checking if the timer 430 has expired since the present rendering request 420. Here, consider that the element-X has replaced an element-Y from a previous layout in response to the present rendering request 420.

If the timer 430 has expired, the application program 34 deems that the layout of the user interface 40 is stable, and hence, accepts the user input, at 1140. Accepting the user input includes the application program 34 transferring the user input to the element-X of the user interface 40 according to the present layout. The application program 34 further performs the one or more operations according to the script of the element-X upon receiving the user input, at 1150.

Instead, if the timer 430 has not yet expired, the application program 34 deems that the layout of the user interface 40 is unstable, at 1130. In such a case, the application program 34 initiates a second timer for a layout check period. The second timer facilitates the application program 34 to determine whether the user 50 provides user input for the element-X in the present layout or for the element-Y from the previous layout of the user interface 40 during the period of instability 210. If the user input is received with the layout check period, that is before the second timer expires, the application program 34 deems that the user input is intended for the element-Y that was previously in the position of element-X, 1170. The user input is accordingly forwarded to the element-Y (and not element-X), and the application program 34 performs one or more operations according to the script of element-Y, at 1150.

Otherwise, if the user input is after the layout check period, that is after the second timer has expired, the application program 34 deems that the user input can be for the element-X in the present layout, at 1160. The application program 34 generates a notification for the user 50, such as a dialog box, a pop-up, or any other notification that confirms with the user 50 that the provided user input is for the present layout, at 1165. In one or more examples, the notification may include a name or other identifier of the element-X that received the user input, and the notification can ask the user 50 whether the user input is for the element-X represented by the identifier.

If the user 50 confirms that the element-X is the intended target of the user input, the user input is accepted and transferred to the element-X to perform the corresponding script operations, at 1150. If the user rejects that the user input is for the element-X, the application program 34 rejects the user input and continues to update the layout, and waits for further user input, at 1110.

The layout check period is preconfigured to durations similar to human reaction times. These reaction times are different for different types of input. For example, the user 50 may be, typically, quicker at tapping (using a touchpad) than at mouse clicks, or using the keyboard. For example, the reaction times can be 0.3 seconds, 0.2 seconds, or any other such preconfigured value. In one or more examples, the layout check period may be determined by the application program 34 based on historical data for user reaction times. For example, the application program 34 may determine the layout check period using the historical data based on a machine learning algorithm.

A timeline for the webpage interaction according to one or more embodiments of the present invention using the flowchart of FIG. 11, is visually substantially similar to the timeline depicted in FIG. 10. In this case, in the time durations (1030, 1032, and 1034) where the user input can still be applicable to a previous layout, which has been stored, the application program 34, instead of transferring the user input to the elements from the previous layout (as in the method of FIG. 9), the application program 34 confirms the user's intention, and only upon such confirmation, transfers the user input to the previous layout (in method of FIG. 11).

Accordingly, one or more embodiments of the present invention facilitate technical solutions for avoiding bad user input during changes to a layout of a user interface. The technical solutions described herein are rooted in computer technology, particularly rendering webpages with which a user interacts. The technical solutions described herein facilitate an improvement to the computer technology by avoiding bad user inputs, or in other words transferring user input to an intended element from the webpage despite a layout of the webpage being in flux or in transition. Furthermore, the technical solutions described herein at least avoid the user input being used to perform an unintended operation by a new element of the webpage that has replaced a previous element to which the user intended to provide the user input. Such improvements reduce user frustration as well as reduces network data being communicated, and other computing resources being used to perform one or more operations that the user did not intend in the first place.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. "Java" and all Java-based trademarks and logos are trademarks or registered trademarks of Oracle and/or its affiliates.

What is claimed is:

1. A computer-implemented method comprising:
receiving a request that updates a first layout of a user interface of an application that is presently being rendered to a second layout, wherein a first user-interface element is at a screen-location in the first layout, and the first user-interface element is replaced by a second user-interface element at said screen-location in the second layout, said screen-location being in a first partition from a plurality of partitions of the user interface;
in response to determining that the first partition is not associated with a script that updates continuously, and receiving a user input at the screen-location in the first partition:
based on a determination that the user input is received after completion of the first predetermined duration, accepting, by the application, the user input for the second user-interface element of the second layout of the user interface, the first predetermined duration corresponding to an unstable layout duration during which the user interface is being updated; and
based on a determination that the user input is received prior to completion of the first predetermined duration:
based on a determination that the user input is received prior to completion of a second duration since receiving the request to update the layout, wherein the second duration represents a historical reaction time of a user interacting with said application, and wherein the second duration is determined by the application using a machine learning algorithm, accepting, by the application, the user input for the first user-interface element of the first layout of the user interface; and
based on the determination that user input is received after the second duration, generating and displaying, by the application, a notification that includes an identifier for the first user-interface element for a user to confirm that the user input is for the first user-interface element, wherein, in response to the user confirming, accepting the user input for the first user-interface element of the first layout of the user interface, otherwise, rejecting the user input.

2. The computer-implemented method of claim 1, wherein accepting the user input comprises performing one or more operations according to a script of the element in response to the user input.

3. The computer-implemented method of claim 1, further comprising, storing a snapshot of the present layout prior to updating the present layout, wherein storing the snapshot of the present layout of the user interface comprises storing positions of one or more elements of the user interface.

4. The computer-implemented method of claim 1, wherein if the user input is received after the second duration, confirming with a user if the user input is intended for the present layout, and accepting the user input for the present layout in response to a confirmation from the user.

5. The computer-implemented method of claim 1, wherein the application is a first application, and the method further comprises:
  based on a determination that the user input is received prior to completion of the predetermined duration:
    based on a determination that the user input is received prior to a third duration since receiving the request to update the layout, wherein the third duration represents a historical reaction time of a user interacting with said second application, and wherein the second duration is determined by said second application using the machine learning algorithm, accepting, by the second application, the user input for the present layout of the user interface; and
    based on the determination that user input is received after the third duration, accepting, by the second application, the user input for the updated layout of the user interface.

6. A system comprising:
  a memory; and
  a processor coupled with the memory, the processor configured to render one or more user interfaces, wherein rendering the user interfaces comprises performing a method that comprises:
  receiving a request that updates a first layout of a user interface of an application that is presently being rendered to a second layout, wherein a first user-interface element is at a screen-location in the first layout, and the first user-interface element is replaced by a second user-interface element at said screen-location in the second layout, said screen-location being in a first partition from a plurality of partitions of the user interface;
    in response to determining that the first partition is not associated with a script that updates continuously, and receiving a user input at the screen-location in the first partition:
      based on a determination that the user input is received after completion of the first predetermined duration, accepting, by the application, the user input for the second user-interface element of the second layout of the user interface, the first predetermined duration corresponding to an unstable layout duration during which the user interface is being updated; and
      based on a determination that the user input is received prior to completion of the first predetermined duration:
        based on a determination that the user input is received prior to completion of a second duration since receiving the request to update the layout, wherein the second duration represents a historical reaction time of a user interacting with said application, and wherein the second duration is determined by the application using a machine learning algorithm, accepting, by the application, the user input for the first user-interface element of the first layout of the user interface; and
        based on the determination that user input is received after the second duration, generating and displaying, by the application, a notification that includes an identifier for the first user-interface element for a user to confirm that the user input is for the first user-interface element, wherein, in response to the user confirming, accepting the user input for the first user-interface element of the first layout of the user interface, otherwise, rejecting the user input.

7. The system of claim 6, wherein accepting the user input comprises performing one or more operations according to a script of the element in response to the user input.

8. The system of claim 6, wherein the method further comprises storing a snapshot of the present layout prior to updating the present layout, and wherein storing the snapshot of the present layout of the user interface comprises storing positions of one or more elements of the user interface.

9. The system of claim 6, wherein if the user input is received after the second duration, confirming with a user if the user input is intended for the present layout, and accepting the user input for the present layout in response to a confirmation from the user.

10. The system of claim 6, wherein the application is a first application, and the method further comprises:
  based on a determination that the user input is received prior to completion of the predetermined duration:
    based on a determination that the user input is received prior to a third duration since receiving the request to update the layout, wherein the third duration represents a historical reaction time of a user interacting with said second application, and wherein the second duration is determined by said second application using the machine learning algorithm, accepting, by the second application, the user input for the present layout of the user interface; and
    based on the determination that user input is received after the third duration, accepting, by the second application, the user input for the updated layout of the user interface.

11. A computer program product comprising a computer readable storage medium having stored thereon program instructions executable by one or more processing devices to perform a method comprising:
  receiving a request that updates a first layout of a user interface of an application that is presently being rendered to a second layout, wherein a first user-interface element is at a screen-location in the first layout, and the first user-interface element is replaced by a second user-interface element at said screen-location in the second layout, said screen-location being in a first partition from a plurality of partitions of the user interface;

in response to determining that the first partition is not associated with a script that updates continuously, and receiving a user input at the screen-location in the first partition:
- based on a determination that the user input is received after completion of the first predetermined duration, accepting, by the application, the user input for the second user-interface element of the second layout of the user interface, the first predetermined duration corresponding to an unstable layout duration during which the user interface is being updated; and
- based on a determination that the user input is received prior to completion of the first predetermined duration and that the first user-interface element is presently in field of view of the user:
  - based on a determination that the user input is received prior to completion of a second duration since receiving the request to update the layout, wherein the second duration represents a historical reaction time of a user interacting with said application, and wherein the second duration is determined by the application using a machine learning algorithm, accepting, by the application, the user input for the first user-interface element of the first layout of the user interface; and
  - based on the determination that user input is received after the second duration, generating and displaying, by the application, a notification that includes an identifier for the first user-interface element for a user to confirm that the user input is for the first user-interface element, wherein, in response to the user confirming, accepting the user input for the first user-interface element of the first layout of the user interface, otherwise, rejecting the user input.

12. The computer program product of claim 11, wherein accepting the user input comprises performing one or more operations according to a script of the element in response to the user input.

13. The computer program product of claim 11, wherein the method further comprises storing a snapshot of the present layout prior to updating the present layout, and wherein storing the snapshot of the layout of the user interface comprises storing positions of one or more elements of the user interface.

14. The computer program product of claim 11, wherein the application is a first application, and the method further comprises:
- based on a determination that the user input is received prior to completion of the predetermined duration:
  - based on a determination that the user input is received prior to a third duration since receiving the request to update the layout, wherein the third duration represents a historical reaction time of a user interacting with said second application, and wherein the second duration is determined by said second application using the machine learning algorithm, accepting, by the second application, the user input for the present layout of the user interface; and
  - based on the determination that user input is received after the third duration, accepting, by the second application, the user input for the updated layout of the user interface.

* * * * *